US007991086B2

(12) United States Patent
Koslov (10) Patent No.: US 7,991,086 B2
(45) Date of Patent: Aug. 2, 2011

(54) SYSTEM AND METHOD FOR IMPROVED CARRIER RECOVERY

(75) Inventor: Joshua Lawrence Koslov, Hopewell, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1240 days.

(21) Appl. No.: 11/632,136

(22) PCT Filed: Jul. 15, 2004

(86) PCT No.: PCT/US2004/022779
§ 371 (c)(1),
(2), (4) Date: Jan. 10, 2007

(87) PCT Pub. No.: WO2006/019371
PCT Pub. Date: Feb. 23, 2006

(65) Prior Publication Data
US 2007/0230637 A1 Oct. 4, 2007

(51) Int. Cl.
*H04L 27/08* (2006.01)
(52) U.S. Cl. ........ 375/345; 375/344; 375/316; 330/129; 330/254; 455/234.1
(58) Field of Classification Search .................... 375/345
See application file for complete search history.

(56) References Cited

U.S. PATENT DOCUMENTS

| 4,119,926 | A | | 10/1978 | Frosch et al. |
| 4,308,619 | A | * | 12/1981 | Hughes .......................... 375/373 |
| 4,320,526 | A | | 3/1982 | Gitlin |
| 4,920,320 | A | | 4/1990 | Matthews |
| 5,057,794 | A | | 10/1991 | Shih |
| 5,077,529 | A | | 12/1991 | Ghoshal et al. |
| 5,131,008 | A | * | 7/1992 | Kazecki et al. ................ 375/344 |
| 5,136,645 | A | | 8/1992 | Brockman |
| 5,384,665 | A | * | 1/1995 | Ohkuma et al. ................ 360/22 |
| 5,471,508 | A | * | 11/1995 | Koslov .......................... 375/344 |
| 5,602,883 | A | | 2/1997 | Stephens et al. |
| 5,659,583 | A | * | 8/1997 | Lane ............................ 375/346 |

(Continued)

FOREIGN PATENT DOCUMENTS
AU 199647928 9/1996
(Continued)

OTHER PUBLICATIONS

Beomsup, "Dual-loop DPLL Gear-Shifting Algorithm for Fast Synchronization,", IEEE Transactions on Circuits and Systems II: Analog and Digital Signal Processing, vol. 44, No. 7, pp. 577-586, Jul. 1997.

(Continued)

*Primary Examiner* — Chieh M Fan
*Assistant Examiner* — Santiago Garcia
(74) *Attorney, Agent, or Firm* — Robert D. Shedd; Robert B. Levy; Jeffrey D. Hale (57) ABSTRACT

A system and method for carrier recovery includes a plurality of carrier recovery modules, each processing the same input symbols, and each having a gain input and an error output. A loop gain control receives errors from the carrier recovery modules and provides gains to the carrier recovery modules. Based upon the errors during a current period, the loop gain control determines which module produced lowest errors, and selects the gain associated with that module as a best gain which is applied to a module which outputs symbols for decoding during a next period.

6 Claims, 7 Drawing Sheets

U.S. PATENT DOCUMENTS

| | | | |
|---|---|---|---|
| 5,666,170 A * | 9/1997 | Stewart | 348/726 |
| 5,671,253 A * | 9/1997 | Stewart | 375/316 |
| 5,754,437 A | 5/1998 | Blazo | |
| 5,757,239 A | 5/1998 | Gilmore | |
| 5,793,824 A | 8/1998 | Burch et al. | |
| 5,867,539 A * | 2/1999 | Koslov | 375/346 |
| 5,870,438 A * | 2/1999 | Olafsson | 375/344 |
| 6,018,556 A * | 1/2000 | Janesch et al. | 375/376 |
| 6,219,095 B1 * | 4/2001 | Zhang et al. | 348/192 |
| 6,430,243 B1 * | 8/2002 | White | 375/376 |
| 6,577,685 B1 * | 6/2003 | Bao et al. | 375/327 |
| 6,707,863 B1 * | 3/2004 | Mrozek et al. | 375/327 |
| 6,920,189 B1 * | 7/2005 | Spalink | 375/326 |
| 7,099,639 B2 | 8/2006 | Akahori | |
| 7,187,731 B2 * | 3/2007 | Popper | 375/344 |
| 7,236,545 B2 * | 6/2007 | Kolze | 375/340 |
| 7,274,735 B2 * | 9/2007 | Lusky et al. | 375/227 |
| 7,302,024 B2 * | 11/2007 | Arambepola | 375/347 |
| 7,558,340 B2 * | 7/2009 | Kim et al. | 375/326 |
| 7,558,341 B2 * | 7/2009 | Han | 375/326 |
| 7,570,576 B2 * | 8/2009 | Kolze | 370/204 |
| 7,668,260 B2 * | 2/2010 | Arambepola | 375/316 |
| 2002/0018519 A1 | 2/2002 | Chiba | |
| 2002/0036713 A1 * | 3/2002 | Zhang et al. | 348/607 |
| 2002/0164969 A1 * | 11/2002 | Meehan | 455/277.1 |
| 2002/0172310 A1 | 11/2002 | Thamsirianunt et al. | |
| 2002/0187767 A1 * | 12/2002 | Meehan | 455/277.1 |
| 2004/0028174 A1 * | 2/2004 | Koren | 378/4 |
| 2004/0062327 A1 * | 4/2004 | Yang | 375/347 |
| 2004/0114675 A1 * | 6/2004 | Crawford | 375/149 |
| 2004/0165682 A1 * | 8/2004 | Jun | 375/326 |
| 2005/0058192 A1 * | 3/2005 | Lee | 375/224 |
| 2005/0141645 A1 * | 6/2005 | Kim et al. | 375/326 |
| 2005/0152462 A1 * | 7/2005 | Tatsuta et al. | 375/259 |
| 2006/0078070 A1 * | 4/2006 | Zhidkov et al. | 375/326 |
| 2008/0225168 A1 * | 9/2008 | Ouslis et al. | 348/554 |
| 2009/0245390 A1 * | 10/2009 | Kim et al. | 375/240.26 |

FOREIGN PATENT DOCUMENTS

| | | |
|---|---|---|
| JP | 738426 | 2/1995 |
| JP | 738428 | 2/1995 |
| JP | 8251243 | 9/1996 |
| JP | 200423330 | 1/2004 |

OTHER PUBLICATIONS

Brugel, "Variable Bandwidth DPLL Bit Synchronizer with Rapid Acquisition Implemented as a Finite State Machine,", IEEE Transactions on Communications, vol. 42, No. 9, pp. 2751-2759, Sep. 1994.

Cessna, et al., "Phase Noise and Transient Times for a Binary Quantized Digital Phase-Locked Loop in White Gaussian Noise", IEEE Transactions on Communications, vol. COM-20. No. 2. Apr. 1972.

Chang et al., "LMS Adaptive Phase Locked Loops for Carrier Recovery," 1999 IEEE Int'l, Symposium on Intelligent Signal Processing and Communication Systems, Signal Processing and Communications Beyond 2000, pp. 581-584, Published, Bangkok, Thailand 1999.

Chii, et al., "PHDPLL for Sonet Desynchronizer," Globecome'91, 1991 IEEE.

Fitz et al., A Performance Analysis of a Digital PLL Based MPSK Demodulator, IEEE Transactions on Communications, vol. 43, No. 2/3/4, Feb./Mar./Apr. 1995.

Hae, et al., "Dual-Loop Digital PLL Design for Adaptive Clock Recovery," IEICE Transactions on Fundamentals of Electornics, Communications and Computer Sciences, vol. E81-A, No. 12, pp. 2509-2514, Dec. 1998.

Huang, et al., Decision-Directed PLL for Coherent Optical Pulse CDMA Systems in the Presence of Multiuser CDMA Systems in the Presence of Multiuser Intereference, Laser Phase Noise, and Shot Noise, Journal of Lightwave Technology, vol. 16, No. 10, Oct. 1998.

Hwang et al., "A Digitally Controlled Phase-Locked Loop with Fast Locking Scheme for Clock Synthesis," 2000 IEEE Int'l. Solid-State Circuits Conf., Digest of Technical Papers (Cat. No. OOCH37056), pp. 168-169, 453, Published Piscataway, NJ 2000, 496 pp.

Lee, "A 250 MHz Low Jitter Adaptive Bandwidth PLL," ISSCC99/Session20/Paper WA10.1, 1999 IEEE Int'l. Solid-State Circuits Conference.

Rebuain et al., "Device and Method for Phase Detection for Use with Digital Phase Locked Loop or Other Phase Sensitive Device," JP7038428, Aug. 29, 2003.

Yamasaki, "Digital Signal Processing Type Adaptive Phase-Locked Circuits Controlling Loop-Orders,", GLOBECOM Tokyo '37, IEEE/IECE Global Telecommunications Conference 1987, Conf. Record. No. 87 CH2520-5, pp. 1325-1329, vol. 2 published NY NY.

* cited by examiner

SYSTEM AND METHOD FOR IMPROVED CARRIER RECOVERY

This application claims the benefit, under 35 U.S.C. §365 of International Application PCT/US2004/022779, filed Jul. 15, 2004, which was published in accordance with PCT Article 21(2) on Feb. 23, 2006, in English.

FIELD OF THE INVENTION

The present invention generally relates to digital communications and, more particularly, to a method and apparatus for optimizing bandwidth for carrier recovery systems.

BACKGROUND OF THE INVENTION

Carrier recovery includes synchronizing received signals to a reference. In many systems this is performed using phase-locked loops (PLL). In digital systems, a digital phase-locked loop (DPLL) is employed which may address a plurality of different issues including phase shift as well as noise considerations. In many systems, as the DPLL loop bandwidth is increased in a digital carrier recovery system, residual phase jitter due to phase noise on the signal is reduced as the DPLL can better track the signal phase noise. However, as DPLL loop bandwidth is increased, more and more additive noise, e.g., white Gaussian noise, enters the carrier recovery loop and causes more residual phase jitter.

In general, for a given condition of phase and additive noise, there may exist a loop bandwidth where the overall residual phase jitter is minimized. In current practice, the carrier recovery loop bandwidth is set to some nominal value based upon expected signal conditions. This results in a suboptimal loop bandwidth and unnecessarily large residual phase jitter following carrier recovery.

Accordingly, there is a need for a system and method, which optimizes loop bandwidth to provide minimum phase jitter responsive to the current signal conditions.

SUMMARY OF THE INVENTION

A system and method for carrier recovery includes a plurality of carrier recovery modules, each processing the same input symbols, and each having a gain input and an error output. A loop gain control receives errors from the carrier recovery modules and provides gains to the carrier recovery modules. Based upon the errors during a current period, the loop gain control determines which module produced lowest errors, and selects the gain associated with that module as a best gain which is applied to a module which outputs symbols for decoding during a next period.

Another carrier recovery embodiment includes a phase detector and a path coupled to the phase detector. The path includes a current gain selected from a plurality of gains input thereto. The current gain is selected based upon a criterion in a previous time period. A phase integrator receives the output of the path and includes a plurality of registers, each of the registers being associated with one of the plurality of gains. A lookup table receives a correction phase from the phase integrator such that a phase correction is provided to a derotator to derotate input symbols for phase detection in the phase detector, the phase detector receiving the derotated symbols.

A method for carrier recovery includes processing symbols in accordance with a current loop gain, and a plurality of other gains, accumulating error information associated with each of the current loop gain and the plurality of other gains and based on the error information, selecting a new gain from one of the current loop gain, and the plurality of other gains for processing the symbols in a next period. In alternate embodiments, the step of selecting may include determining a minimum error of a plurality of errors, each error being associated with a gain, and selecting as the new gain that gain associated with the minimum error. The step of processing may include processing the same symbols by a plurality of modules, each module having its own gain associated therewith.

Each gain is preferably associated with an average mean squared phase error. The gain associated with the smallest mean squared phase error is used to process the derotated symbols which are sent to subsequent processing, e.g., forward error correction. However, the phase errors associated with the other gains continue to be determined while processing the same symbols and remain candidates for the lowest phase error selection in future time periods.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention is directed to carrier recovery systems. The present invention automatically optimizes loop bandwidth for a signal impaired by, e.g., phase noise and additive noise. Carrier recovery systems regenerate a local carrier locked to an incoming signal for systems in which phase conveys information. Systems such as, phase shift keying (PSK) and Quadrature Amplitude Modulation (QAM), are examples where phase data is used to convey information. A digital phase-locked-loop (DPLL) is generally used in such systems. The loop bandwidth used in the DPLL represents a compromise between phase noise tracking (e.g., a large loop bandwidth is better) and additive noise corruption (where, e.g., a small loop bandwidth is better). The present invention provides an approach that automatically optimizes the DPLL loop bandwidth as a function of the phase noise and additive noise encountered on the signal to balance the effects of the DPLL bandwidth.

It is to be understood that the present invention is described in terms of a DPLL system for carrier recovery; however, the present invention is much broader and may be included with any communication system, integrated circuit or data processing system, which transmits or receives information in a synchronized way. In addition, the present invention is applicable to any system where error, e.g., phase error is employed to convey information or needs to be adjusted for proper system function. The present invention may be employed in the telecommunication industry, the radio or television industry, in semiconductors or other integrated circuits, cable or satellite communications, etc.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

Figure 1:
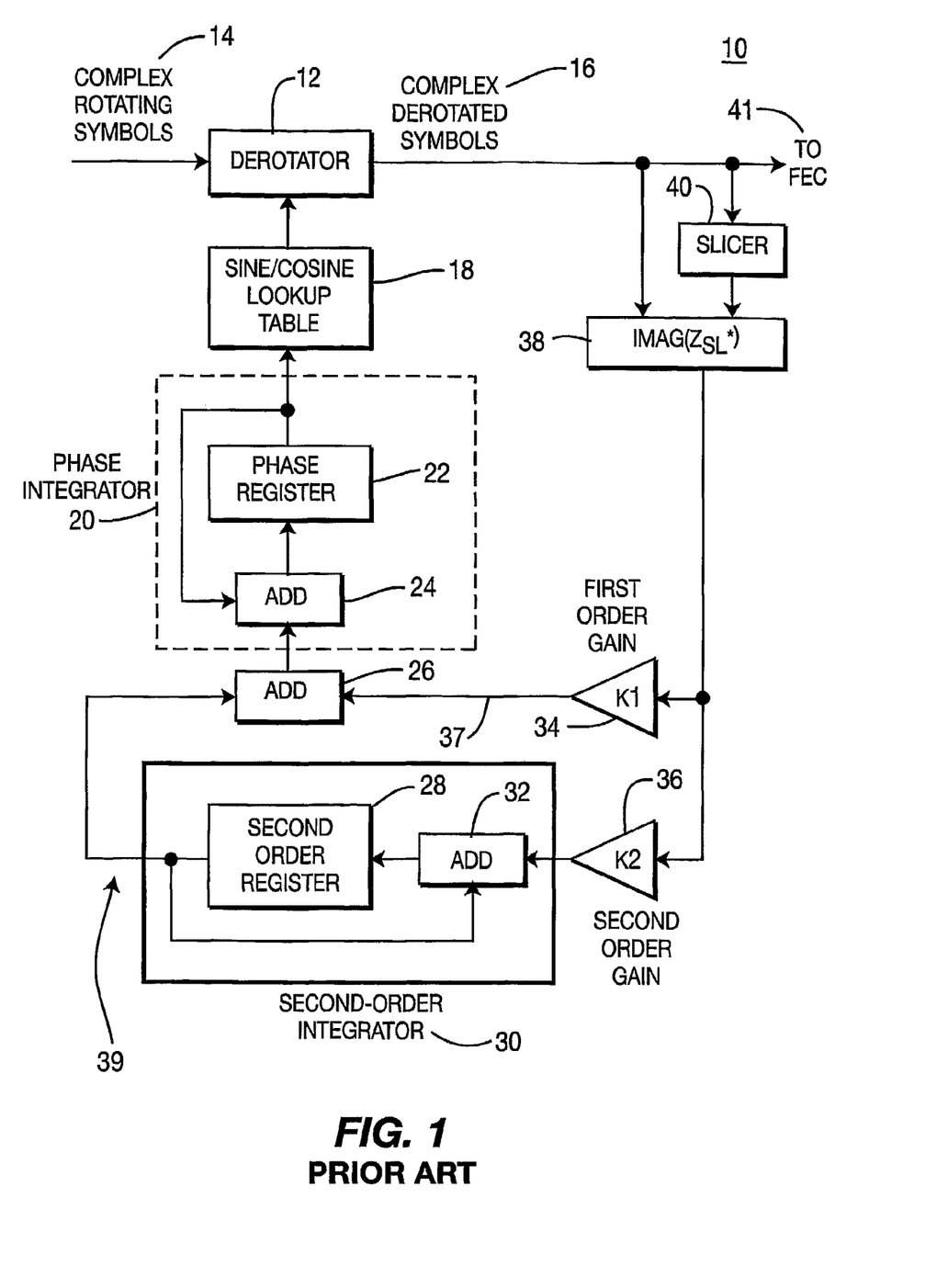
FIG. 1 is a block diagram of a carrier recovery module in accordance with the prior art.

Referring now in specific detail to the drawings in which like reference numerals identify similar or identical elements throughout the several views, and initially to FIG. 1, a carrier recovery system 10, which is known in the art, is shown. System 10 comprises a phase detector 38, which estimates the phase difference between two signals and outputs a result based on phase mismatch. A slicer 40 is employed to provide a sliced (target) symbol for comparison against the derotated symbol 16. First and second-order paths 37 and 39 connect to a phase integrator 20, which then addresses a lookup table 18 to convert a derotation phase into complex sine/cosine values to derotate the signal in derotator 12. The phase integrator 20 and lookup table 18 together thus perform the function of a numerically-controlled oscillator (NCO). Derotated symbols 16 may then be decoded into data by a demapper or, more typically, a forward-error correction (FEC) decoder or decoders 41. Both phase integrator 20 and second-order integrator 30 include a register 22 and 28, respectively, and adder 24 and 32, respectively. Each path 37 and 39 includes an amplifier 34 and 36 to provide a gain for its respective path. First and second order paths 37 and 39 are added by adder 26 prior to application to phase integrator 20.

Figure 2:
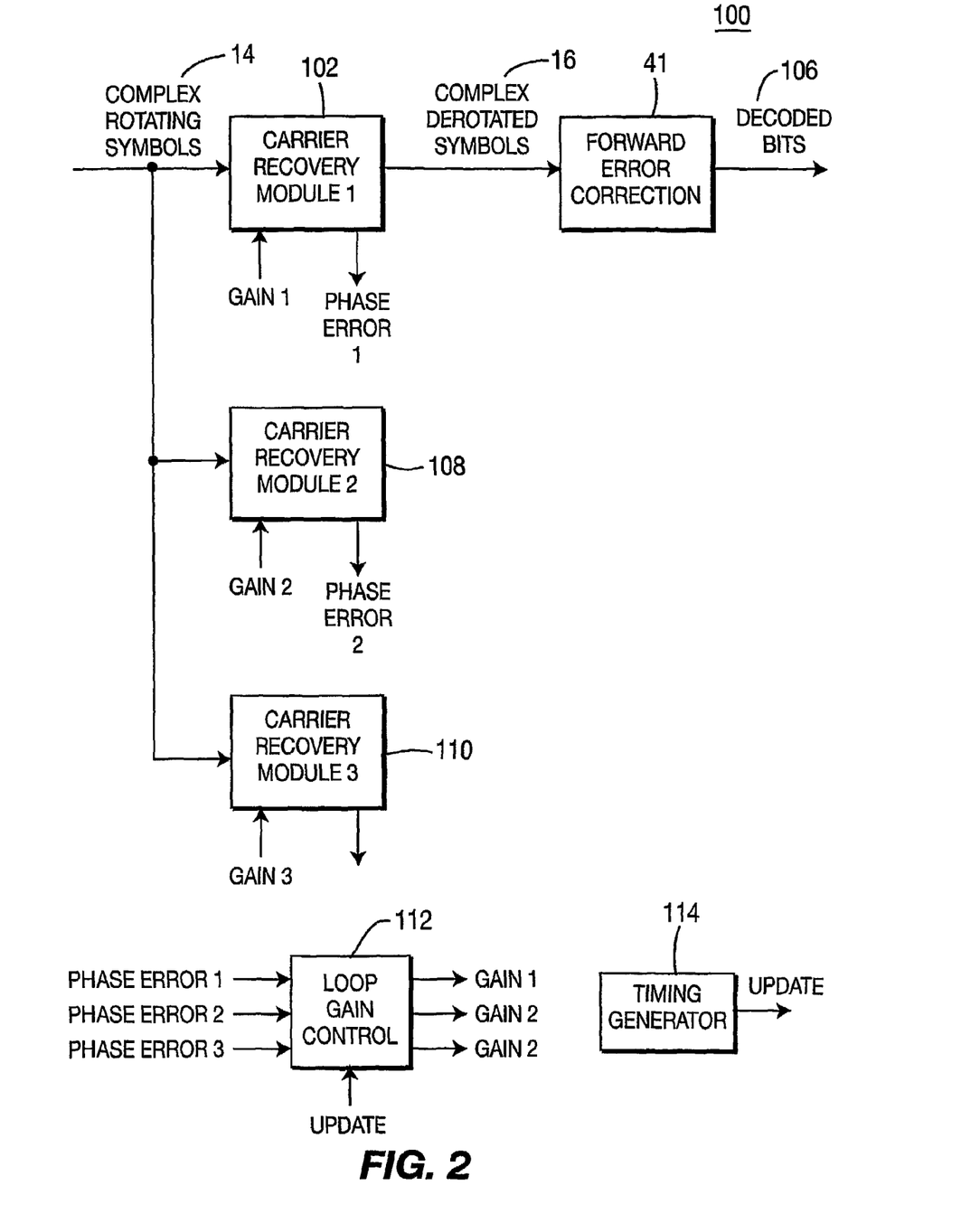
FIG. 2 is a block diagram of a system of carrier recovery modules with a loop gain control in accordance with one embodiment of the present invention.

Referring to FIG. 2, an illustrative embodiment of the present invention is depicted. A system 100 includes multiple loop bandwidths, which are tested over an analysis period and, based upon some criterion of goodness or fitness, a best loop bandwidth is selected and used as one of the bandwidths during the next analysis period. System 100 illustratively includes three parallel carrier recovery modules 102, 108 and 110. Each module 102, 108 and 110 processes the same data set, e.g., a same set of rotating received symbols 14. Each carrier recovery module 102, 108, and 110 has a symbol input 14, gain input (gain 1, 2 or 3) and error output (phase error 1, 2, or 3).

The gains (gain 1, gain 2, gain 3) supplied to the three carrier recovery modules 102, 108 and 110 are supplied by a loop gain control module 112, as will be described below. The loop gain control module 112 receives the error outputs (phase error 1, phase error 2, phase error 3) from the three carrier recovery modules 102, 108, 110, and provides the gains (gain 1, gain 2, gain 3) to the carrier recovery modules 102, 108 and 110. Module 112 also includes an update input ("UPDATE").

During a predefined analysis period, a timing generator 114 generates an update signal to apply a new set of gains to the three carrier recovery modules 102, 108 and 110. The time period may include any suitable elapsing of time, preferably the time period between updates is optimized to provide the best performance. The details of one of the carrier recovery modules 102 are shown in FIG. 3.

Figure 3:
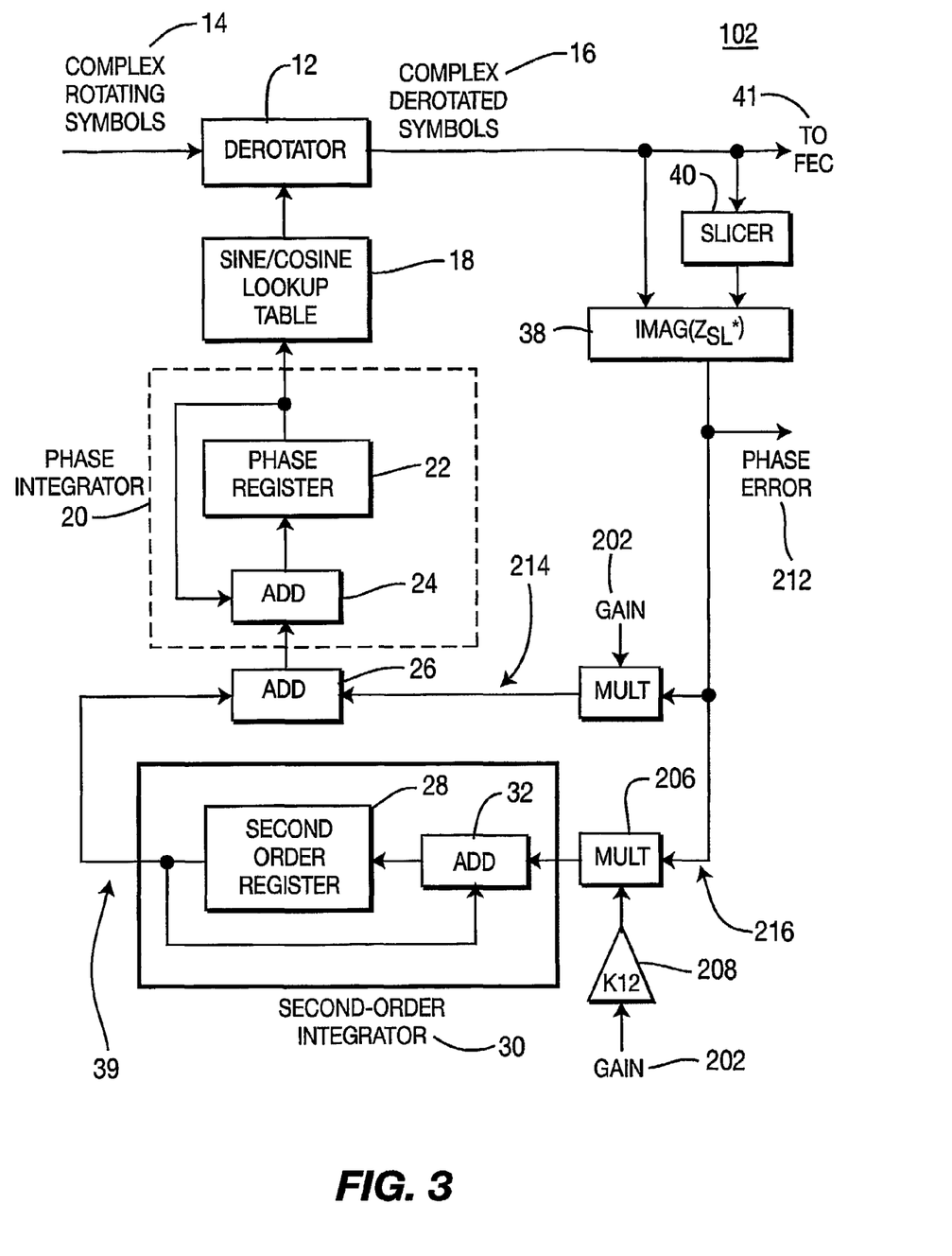
FIG. 3 is a block diagram of a carrier recovery module for the system of FIG. 2 in accordance with one embodiment of the present invention.

Referring to FIG. 3, the operation of the carrier recovery module 102 is similar for modules 108 and 110. In addition, many of the operations of module 102 are similar to that of the known carrier recovery circuit 10 shown in FIG. 1. An input symbol 14 is derotated by derotator 12, which is a complex multiplier. The phase error between the derotated symbol 16 and a target (sliced) symbol provided by slicer 40 is determined by calculating the imaginary part of the symbol times the conjugate of the sliced symbol, that is:

$$\phi_{err,est} \approx \mathrm{imag}(z \cdot z_{sl}^*) = |z| \cdot |z_{sl}| \sin(\angle z - \angle z_{sl}) \approx |z|^2 |\phi_{err}|.$$

where z is the symbol and $z_{sl}^*$ is the conjugate of the sliced symbol, $z_{sl}$ is the sliced symbol and $\angle z$ and $\angle z_{sl}$ are the phase angles of the symbol and the sliced symbol, respectively.

The phase error estimate $\phi_{err}$ is multiplied by first-order gain 202 using multiplier 214 in a first-order path 214, and the phase error estimate $\phi_{err}$ is multiplied by second-order gain 202, as modified by amplifier 208, by multiplier 206. An amplifier or multiplier 208 may be employed to amplify or condition gain 202 for a second-order path 216. The second-order path 216 includes an integrator 30. A second-order register 28 is clocked at the symbol rate (not shown). The first- and second-order paths (214 and 216) are added together by adder 26 and then integrated by integrator 20 to get the correction phase. A phase register 22 is clocked at the symbol rate (not shown). This phase is then applied to a sine/cosine lookup table 18 to provide the complex value to derotate the next symbol in derotator 12. It should be understood that second order path 216 may be eliminated completely from the carrier recovery module, or that additional paths may be added to the first-order path 214.

A variable gain 202 is input to the circuit and is used directly in the first-order path 214. This gain 202 is scaled down by factor K12 smaller than one to be used in the second-order path 216 by amplifier 208. Phase error 212 is supplied from the circuit to be analyzed within the loop gain control circuit. The details of the loop gain control module are illustratively described with reference to FIG. 4.

Figure 4:
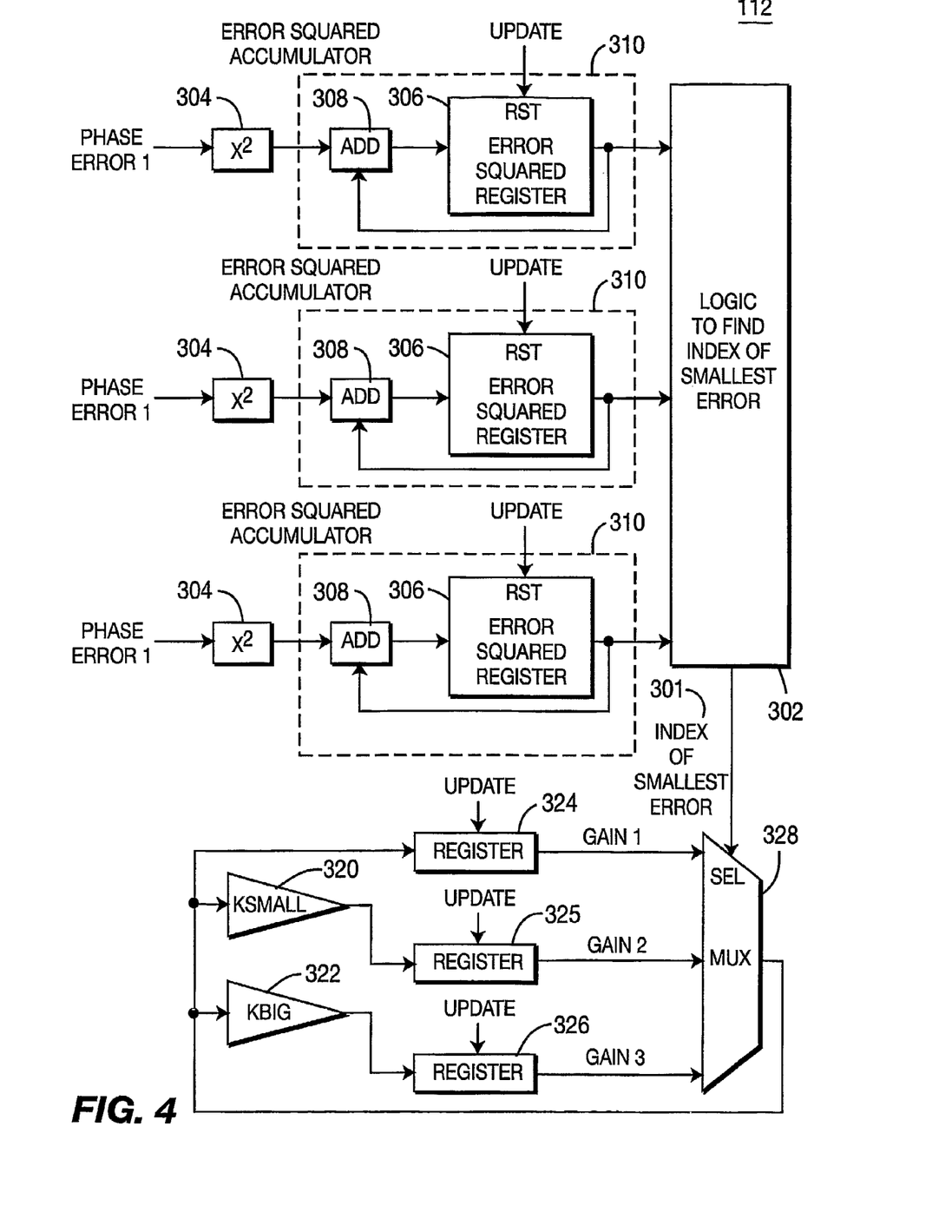
FIG. 4 is a block diagram of the loop gain control of FIG. 2 in accordance with one embodiment of the present invention.

Referring to FIG. 4, the loop gain control module 112 examines the three input error signals (phase error 1, 2 and 3) and determines which error signal has the minimum mean squared value, using logic 302. In the embodiment shown, each phase error is squared in block 304 and the error is passed to accumulator 310 where an error squared register 306 is updated by adding the new error using an adder 308.

When the update signal (UPDATE) is asserted, module 112 selects the gain which produced that minimum error signal as new Gain 1, and produces new Gain 2 less than Gain 1 and new Gain 3 greater than Gain 1. This selection is made using a multiplexer 328, which is responsive to the index 301. When the update signal is asserted, the three error signal accumulators 310 (i.e., registers 306) are reset to zero to begin the process of accumulating squared errors in the next analysis period.

In the loop gain control circuit 112, all three phase errors supplied by the three carrier recovery modules 102, 108 and 110 are squared (304) and integrated (310). The three error-squared registers 306 are clocked at the symbol rate (not shown). These integrated errors are supplied to a logic block 302, which determines an index of the smallest error 301. For example, if the integrated value of Phase Error 1 is smaller than either of the integrated values of Phase Errors 2 or 3, the logic 302 puts out the index 1.

Three registers 324, 325, and 326 include three gains used in the current analysis period by the three carrier recovery modules 102, 108 and 110. At the end of the analysis period, an update signal (UPDATE) is asserted to clock all three registers 324, 325 and 326. At that time, the register holding gain 1 receives the gain, which had resulted in the smallest accumulated errors during the analysis period. That is, if the smallest error index is 2, then the carrier recovery circuit using Gain 2 resulted in the lowest accumulated errors, and Gain 2 is registered as new Gain 1 for the next analysis period. At the same time, Gain 2 is multiplied by multiplier 320 by a value less than one Ksmall to produce a new Gain 2, and Gain 2 is multiplied by a multiplier 322 by a value greater than one Kbig to produce a new Gain 3. Hence, three new gains are registered to be used for the next analysis period, including the best gain available from the previous analysis period, and two additional gains, which are slightly smaller and slightly larger than the best gain from the previous analysis period.

When the update signal is asserted and new gains are selected, the three accumulators 310 are reset to zero to get meaningful integrations of phase errors during the next analysis period.

As can be seen from FIG. 2, since Gain 1 registers the best gain found from the previous analysis period, carrier recovery module 102 is used for the actual data decoding, that is, its derotated symbols are output for use by FEC 41 or other subsequent circuitry.

Figure 5:
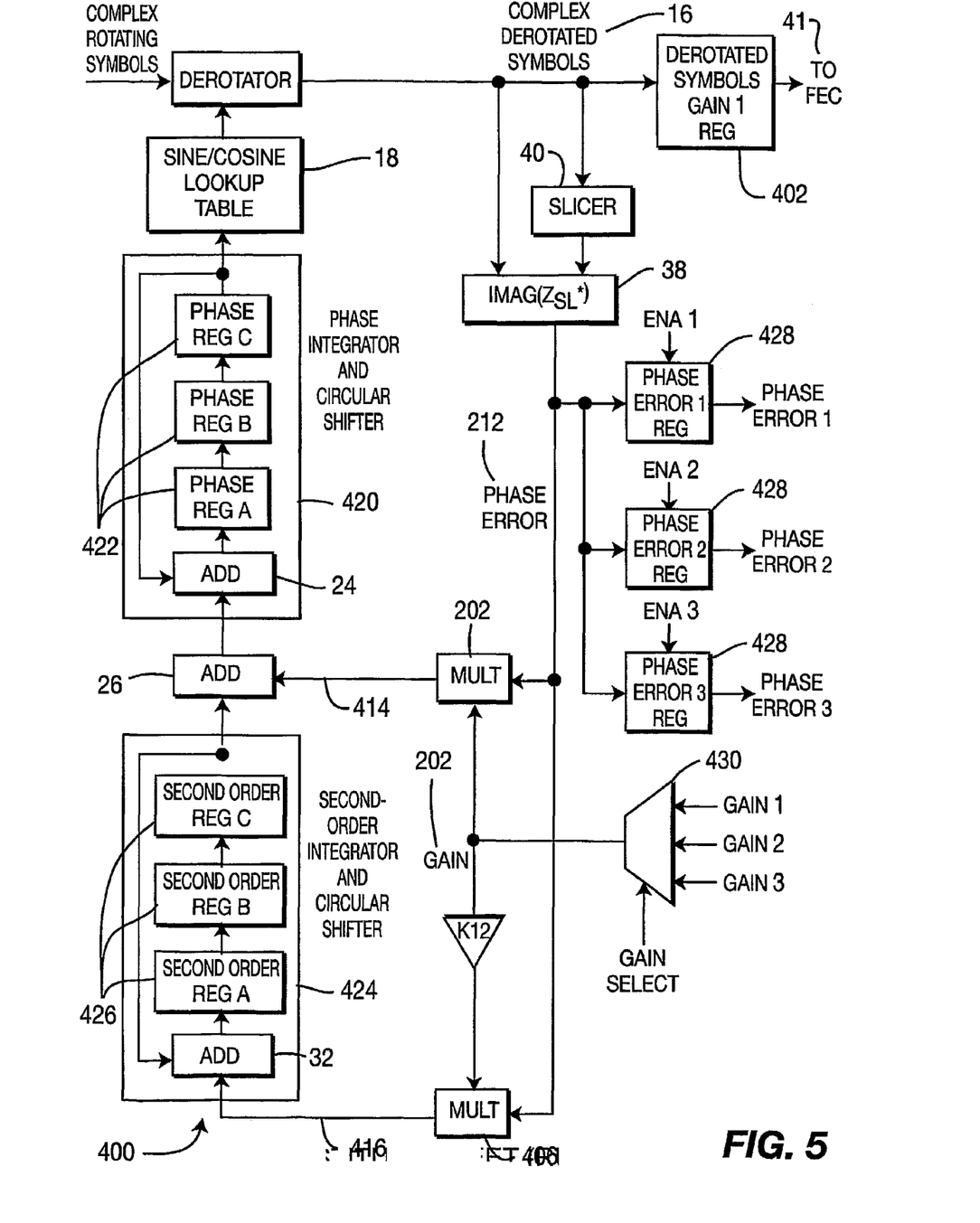
FIG. 5 is a block diagram of an alternative embodiment of the present invention for carrier recovery wherein the system provides circular shifting and reuses components while maintaining state information corresponding to multiple gains.

Referring to FIG. 5, an alternate implementation is shown which saves on hardware requirements. This is based upon reuse of hardware, and recognition that for each of the three carrier recovery modules 102, 108 and 110 of FIG. 2, a state is stored by a phase integrator/accumulator 422 and a second-order integrator/accumulator 426 on second order path 416. Hence, if multiple clock cycles per symbol are available, a single carrier recovery module 400 with multiple state elements (422 or 426) can be used to implement the functionality of three individual carrier recovery modules 102, 108 and 110 as in FIG. 2. In FIG. 5, only a single derotator (complex multiplier) 12, phase detector 38, first-order multiplier 404, second-order multiplier 406, and sine/cosine lookup table 18 are needed.

The basis for this implementation is that each rotating symbol 14 input to the circuit remains constant for the symbol period, during which time, effectively, it is applied to three different carrier recovery circuits employing three different gains. In this implementation, second-order registers A, B and C (426) and phase registers A, B and C (422) are clocked at three times ("3×") symbol rate (not shown). Structures 420 and 424 combine integrators with multiplexers through configuration of registers 422 and 426 and adders 24 and 32 as, for example, circular shift registers. Other multiplexing/de-multiplexing configurations may also be employed Those derotated symbols produced using Gain 1 are registered at the output of the derotator 12 in an enabled register 402, for use in FEC 41 or other subsequent circuitry. When ENA 1 is high, the input of the register 402 is stored on the next positive 3× clock edge. Similarly, phase errors 1, 2 and 3 are registered in enabled registers 428. When ENA 1, 2 or 3 is high, the input of the register 428 is stored as phase error 1, 2 or 3, respectively, on the next 3× clock edge. The gains from the loop gain control module 112 (FIG. 2) are selected via a multiplexer 430. The gain select value rotates in the sequence (1, 2, 3, 1, 2, 3 . . . ). The enable signals ENA are high at the corresponding times of the gain select values, that is, ENA 1 is high when gain select is 1, and so forth. It should be understood that second-order path elements 208, 406, 424 and adder 26 may be eliminated, or that additional paths may be added to the first-order path.

Higher or lower clock rates, for example two or four times the symbol rate or higher, may be available and can be used in such a circuit through the addition of appropriate enable signals. The implementations described herein permit the application of multiple loop bandwidths to the same sets of data. In other implementations, a single carrier recovery circuit may be used and a single loop gain can be used during an analysis period. For example, a Gain 1 can be used for an analysis period and the associated integrated errors calculated. In the next analysis period, a smaller Gain 2 can be tried; in a third analysis period, a larger Gain 3 can be tried. Following all three analysis periods, the best gain can be selected and used as the main operating Gain 1, and a new smaller Gain 2 and larger Gain 3 selected for another sequence of three analysis periods. The advantage of such an approach is optimization of loop bandwidth without the need for multiple carrier recovery circuits or multiple operations per symbol.

The embodiments above may also be modified in a plurality of ways. For example, the second-order gain of the loop may be proportional to the square of the natural frequency of the DPLL, $\omega_n$. The first-order gain of the loop may be proportional to the product of the natural frequency times the damping factor. Therefore, to maintain a constant damping factor (or constant peaking in the loop frequency response), the second-order gain is the first-order gain of the loop multiplied by a constant and also by the first-order gain, as shown in FIGS. 6 and 7.

Figure 6:
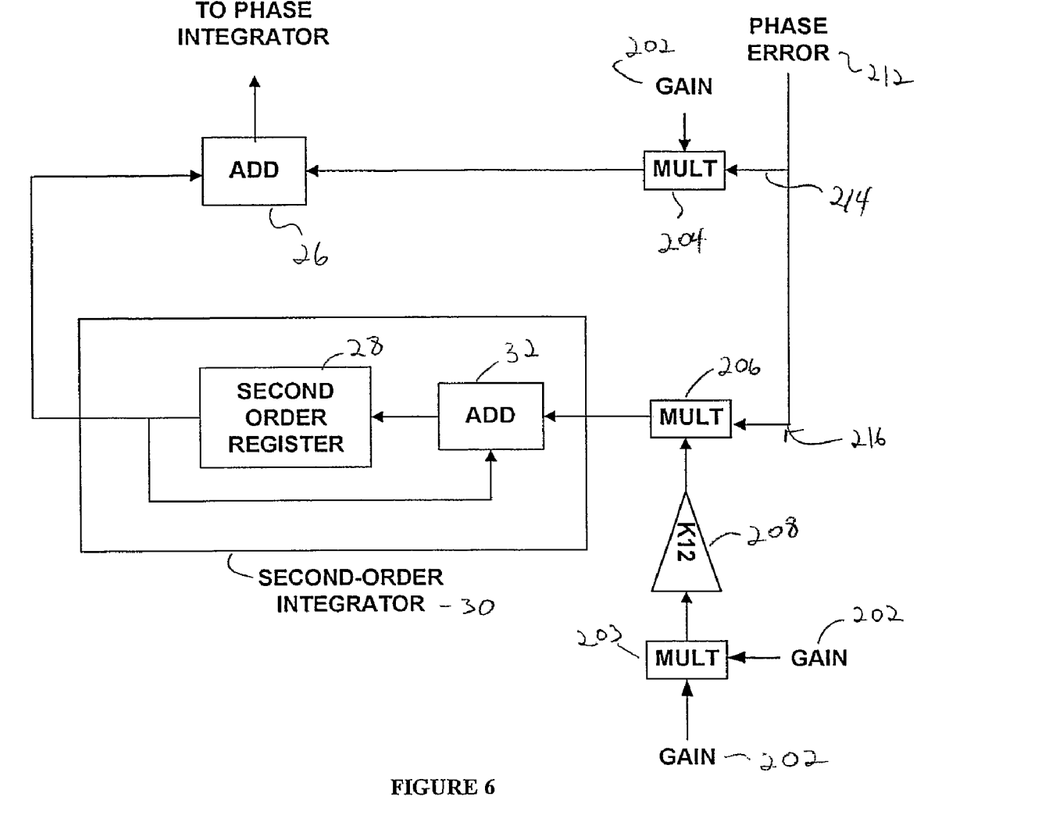
FIG. 6 shows an alternative loop filter configuration for use in the embodiments of FIG. 3 and FIG. 5.
Figure 7:
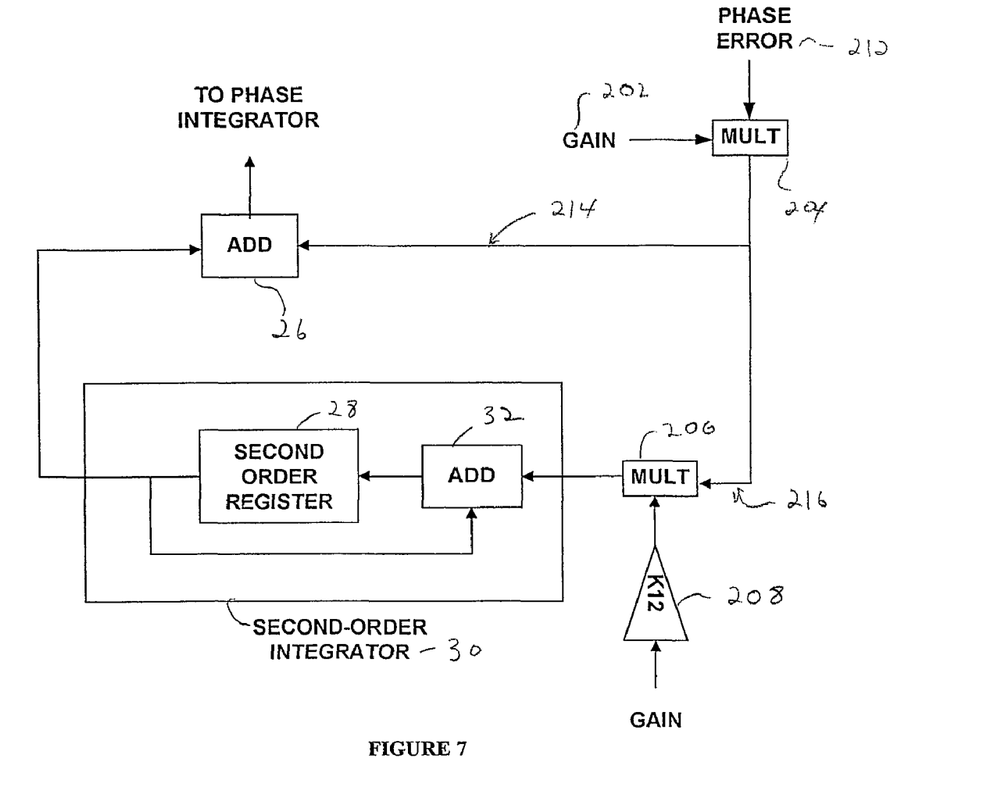
FIG. 7 shows an alternative loop filter configuration for use in the embodiments of FIG. 3 and FIG. 5.

Referring to FIG. 6, the overall second-order gain applied to multiplier 206 is K12 times GAIN (202) times GAIN (202) from a multiplier 203. Referring to FIG. 7, multiplier 206 is applied following multiplier 204, so that the cascaded gain in the second-order path is again GAIN*GAIN*K12, where K12 includes a constant for a constant damping ratio.

Given the illustrative examples above, many alternate embodiments may be employed in accordance with the present invention. For example, criteria of goodness may be minimum mean-squared phase error as estimated by the phase detector, as described above, minimum mean-squared distance to target symbols, or some other criteria. Other embodiments may employ different hardware or software configurations, include any number of phase error and gains modules, etc. In one such embodiment, gains for the first path may be controlled independently of gains in a second path. In one example, this would include first order gains and second order gains, which may be selected based upon minimum errors determined in a previous time period. In another example, first order gains may be selected based upon minimum errors determined in a previous time period, and second order gains may be selected based upon minimum errors determined in a different previous time period.

Having described preferred embodiments for methods and systems for improved carrier recovery (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A system for carrier recovery, comprising:
   a plurality of carrier recovery modules, each processing the same input symbols, and each having a gain input and an error output;

a loop gain control which receives errors from the carrier recovery modules and provides gains to the carrier recovery modules, and based upon the errors during a current period, the loop gain control determines which module produced lowest errors, and selects the gain associated with that module as a best gain which is applied to a module which outputs symbols for decoding during a next period, wherein the best gain is employed to calculate additional gains to be provided to other modules to be used in subsequent periods for processing input symbols.

2. The system as recited in claim 1, wherein the additional gains are calculated using a multiplier to provide a first gain greater than the best module gain and a second gain less than the best module gain.

3. A carrier recovery module, comprising:
a phase detector;
a path coupled to the phase detector, the path including a current gain (GAIN) selected from a plurality of gains input thereto, the current gain being selected based upon a criterion in a previous time period;
a phase integrator, which receives the output of the path, the phase integrator including a plurality of registers, each of the registers being associated with one of the plurality of gains; and a lookup table for receiving a correction phase from the phase integrator such that a phase correction is provided to a derotator to derotate input symbols for phase detection in the phase detector, the phase detector receiving the derotated symbols, wherein the phase integrator includes a circular shifter such that one register is associated and active during a period associated with one of the plurality of gains.

4. A carrier recovery module, comprising:
a phase detector;
a path coupled to the phase detector, the path including a current gain (GAIN) selected from a plurality of gains input thereto, the current gain being selected based upon a criterion in a previous time period;
a phase integrator, which receives the output of the path, the phase integrator including a plurality of registers, each of the registers being associated with one of the plurality of gains; and a lookup table for receiving a correction phase from the phase integrator such that a phase correction is provided to a derotator to derotate input symbols for phase detection in the phase detector, the phase detector receiving the derotated symbols, wherein errors are accumulated for each gain using an error squared accumulator and wherein a smallest accumulated error from the error squared accumulators is employed to select a new gain value for processing symbols for to be used a next time period, the new gain being selected from the plurality of gains.

5. A carrier recovery module, comprising:
a phase detector;
a path coupled to the phase detector, the path including a current gain (GAIN) selected from a plurality of gains input thereto, the current gain being selected based upon a criterion in a previous time period;
a phase integrator, which receives the output of the path, the phase integrator including a plurality of registers, each of the registers being associated with one of the plurality of gains; and a lookup table for receiving a correction phase from the phase integrator such that a phase correction is provided to a derotator to derotate input symbols for phase detection in the phase detector, the phase detector receiving the derotated symbols, wherein symbols are processed for all associated gains wherein an error determination is made for all gains of the plurality of gains such that all gains remain candidates for use in a future period of time.

6. A carrier recovery module, comprising:
a phase detector;
a first order path and a second order path coupled to the phase detector, the first order path including a current gain selected from a plurality of gains input thereto, the second order path including a multiple of the current gain input thereto, the second order path further comprising a second order integrator having a plurality of registers for accumulating errors, each register being associated with a one of the plurality of gains, wherein the second order integrator includes a circular shifter such that one register is associated and active during a period associated with one of the plurality of gains;
a phase integrator, which receives an addition result by adding the first and second order paths, the phase integrator including a plurality of registers, each of the registers being associated with one of the plurality of gains;
a lookup table for receiving a correction phase from the phase integrator such that a phase correction is provided to a derotator to derotate input symbols for phase detection in the phase detector, the phase detector receiving the derotated symbols.

* * * * *